United States Patent

Hjørnevik et al.

[11] Patent Number: 5,935,625
[45] Date of Patent: Aug. 10, 1999

[54] ANIMAL FEED ADDITIVES AND FEEDSTUFF CONTAINING SAID ADDITIVES

[75] Inventors: Leif Hjørnevik, Skien; Freddy Johnsen, Rånåsfoss, both of Norway; Franz Ploenes, Tönisvorst, Germany

[73] Assignee: Norsk Hydro ASA, Oslo, Norway

[21] Appl. No.: 08/952,340

[22] PCT Filed: May 10, 1996

[86] PCT No.: PCT/NO96/00114

§ 371 Date: Jan. 29, 1998

§ 102(e) Date: Jan. 29, 1998

[87] PCT Pub. No.: WO96/35337

PCT Pub. Date: Nov. 14, 1996

[30] Foreign Application Priority Data

May 12, 1995 [NO] Norway ..................................... 951883

[51] Int. Cl.⁶ ........................................... A23L 1/304
[52] U.S. Cl. ................ 426/74; 426/2; 426/626; 426/635; 426/636; 426/807
[58] Field of Search ................... 426/2, 74, 626, 426/807, 635, 636

[56] References Cited

U.S. PATENT DOCUMENTS 5,006,558  4/1991  Poralla et al. ........................ 514/557
5,637,312  6/1997  Tock et al. ................................ 426/2

FOREIGN PATENT DOCUMENTS

| 85073 | 2/1958 | Denmark . |
|---|---|---|
| 0009366 | 4/1980 | European Pat. Off. . |
| 0112080 | 6/1984 | European Pat. Off. . |
| 0219997 | 4/1987 | European Pat. Off. . |
| 0317668 | 5/1989 | European Pat. Off. . |
| 1505388 | 3/1978 | United Kingdom . |

OTHER PUBLICATIONS

Gmelins "Handbuch der anorganischen Chemie", 8.Ed System No. 21, Verlag Chemie G.M.B.H. Berlin 1928, pp. 816–819.

Gmelins "Handbuch der anorganischen Chemie", 8.Ed System No. 22, Verlag Chemie G.M.B.H. Berlin 1928, pp. 919–921.

*Primary Examiner*—Helen Pratt
*Attorney, Agent, or Firm*—Wenderoth, Lind & Ponack, L.L.P.

[57] ABSTRACT

An animal feed additive and a feedstuff containing 0.2–2.5 weight % of the additive. The additive contains dicompounds of formic acid salt. The additive may also contain a desiccant. The additive contains 20–99 weight % potassium diformate, 0–50 weight % sodium di/tetra-formate, 0–25 weight % calcium formate, 0–4 weight % desiccant and 0–5 weight % water.

5 Claims, No Drawings

ANIMAL FEED ADDITIVES AND FEEDSTUFF CONTAINING SAID ADDITIVES

BACKGROUND OF THE INVENTION

1. Field of the Invention

The present invention relates to animal feed additives comprising disalts of formic acid. The invention further comprises animal feedstuff containing said additives.

A general problem with feed additives comprising monocarboxylic acids, and especially formic acid, are loss of acid due to evaporation. This causes an off-spec product and corrosion problems in the equipment for making the feed and is also hazardous to those handling the additive and the feedstuff. Another problem is making additives that are free-flowing and which easily can be mixed with the other ingredients of the feedstuff. The additives must also be stable during storage and able to endure the temperatures they are exposed to during production of the feed, without decomposing.

2. Description of the Related Art

Application and effects thereof of monocarboxylic acids like formic acid and formates like calcium formate in animal feedstuff are generally known in the art. The effects of these additives have been found to give increased growth rate, improvements of feed conversion and reduced diarrhoea frequency. Thus it is known from EP 0317668 A1 that promoted growth of piglets can be achieved by applying a conventional fodder containing 5–25% of a dry mixture containing 3–5 parts of calcium formate. Said dry mixture further contains 1–25 parts fat, 18–28 parts protein, 13–20 parts minerals, 3–5 parts citrate and 30–50 parts lactose. However, this additive does have some disadvantages and limitations of use. Calcium formate has a low water solubility and can only be used in limited amounts to avoid too high total content of calcium in the feed. The concentration of formate in the additive is rather low and the effect is only of the same order of magnitude or lower as when formic acid is added to the feed. This is further shown in an article by M. Kirchgessner and F. X. Roth, "Use of formates in the feeding of piglets", Landwirtsch. Forschung 40, 2–3, 1987. On page 149 it is stated that "Cafo (calcium formate) influenced the feed consumption of the piglets only slightly; the animals improved feed conversion at about 5% at the highest dose levels (2.7/2.6% Cafo)".

From EP 219997 is further known a preservative composition for adding to animal feedstuff comprising a binary blend of formic acid and propionic acid with synergistic activity. The aqueous blend of acids is impregnated in a solid carrier such as silica. 0.1–10% of the blend is used in feed for pigs, cattle or poultry. One disadvantage of the additive is that the percentage of active agent on the carrier is rather low. Further, due to the poor thermal stability of the product the risk for losing some of the acid during production and storage is rather high and thereby the effective cost of the active substance is increased. The impregnated carrier might also cause damage to the equipment and those being exposed to the product due to leakage/evaporation of acid from the carrier.

The nutritive effect of fumaric acid by varying the protein quality and protein content of the feed on fattening performance of broilers is described in an article in Archiv für Geflügelkunde 1991, 55 (5) pages 224–232, Eugen Ulmer & Co, Stuttgart, Germany. On the average fumaric acid seemed to improve final live weight by 3.9% and feed conversion by 2.6%, whereas the feed intake was not affected. The nutritive effect on weight gains decreased from 4.2–2% during the several growth periods. Feed utilisation changed from 3 over 2 to 2.5%. The increase in efficiency of the organic acid related to the lower nutrient supply was more pronounced only in period 0–14 days.

In the product data sheet for PRESCO International there is described application of the additive "Formic Spray" (formic acid on a carrier) in amounts of 0.5–1.5% in feedstuff for piglets, pigs, cows, broilers and layers. Said additive is stated to improve in general the efficiency of feedstuff for these animals. This additive has, however, experienced a considerable loss of formic acid during storage.

In GB Patent No. 1.505.388 there is described formation of aqueous solutions of complex salts from ammonium ions and/or of a metal selected from Group I and II of the Periodic Table and at least one carboxylic acid. The ratio of acid to ammonium and/or metal ions being in the range of 2:1 and 4:1 on a chemical equivalent basis. The concentration of water in the aqueous solution being between 15–75% by weight of the total composition. Said solution of complex salts or disalts of carboxylic acids is stated to be a preservative composition to prevent growth of mould, bacteria and fungi and therefor useful in animal feed which in the patent is also named "substrate". When applied as a preservative to a substrate the liquid composition suitably contains between 0.1–5% of the inorganic complex acid salt based on the weight of the substrate treated. The only example relating to use of formates is ammonium diformate in silage which is not the same type of animal feedstuff which the present application relates to. Ammonium diformate is the most unstable of all the diformates and the teachings of this patent does not give any teaching for application of diformates except for silage and similar types of feedstuff and then in connection with prevention/reduction of growth of mould, fungi and bacteria.

BRIEF SUMMARY OF THE INVENTION

The main object of the present invention was to arrive at a new additive comprising salts of formic acid.

A further object was to arrive at such additives that possessed high concentrations of the active ingredients and still being free-flowing and stable during storage and handling, including production of the final feedstuff.

A further object was to obtain animal feedstuffs containing the new additive in desired amounts for obtaining the required effects and still being within the specifications with regard to total content of elements like sodium, potassium and calcium.

In their search for new additives for animal feedstuffs the inventors desired to retain the advantages and positive effects of the above described active ingredients. The problem was to overcome the disadvantages of the known additives. Various special mixtures of formates, acetates and the like were investigated without success. Then it was focused on possible application of various types and mixtures of diformates.

DETAILED DESCRIPTION OF THE INVENTION

In the literature it was found that potassium-, sodium- and ammonium formates could form double salts with formic acid. Calcium formates did not form such double or disalts. Similar disalts can also be formed from acetic-, propionic- and fumaric acids with their respective salts. According to the literature, Gmelins Handbuch der anorganischen Chemie, 8 Ed. System No 21 and 22, Verlag Chemie G.M.B.H., Berlin 1928, pages 818–857 and pages 919–949, respectively.

Potassium diformate is a most stable crystalline salt having a decomposition temperature above 120° C. while ammonium diformates are less stable and decompose in the range 20–25° C. Sodium diformate is reported to decompose in the range 100–120° C. Sodium tetra-formate can also be formed according to a similar reaction mechanism. When these salts decompose, acid is released.

The information about the above stated disalts are rather limited and there is not reported commercial production of such salts. However, the reported stability for the sodium- and potassium salts made them interesting in the actual respect as the production of feedstuffs can be performed within the temperature range where some of these salts are stable. Further investigations revealed a considerable reduction in hygroscopicity compared with formates, and mixing them with minor amounts of desiccants like special types of silica, starch and the like gave very promising results considering storage and handling properties.

Various compositions and mixtures of diformates were tested with regard to obtaining additives having high contents of acid and its salt, especially sodium and/or potassium formates and formic acid. The theoretical portion of formic acid in the disalt increased from potassium formate to ammonium formate as follows:

TABLE I

| Formate | Formic acid % | Formate % | Decomp. temp. ° C. |
| --- | --- | --- | --- |
| Potassium diformate | 35.3 | 69.2 | 120–125 |
| Sodium diformate | 40.3 | 78.9 | 100–120 |
| Ammonium diformate | 42.2 | 82.5 | 25–30 |
| Sodium tetraformate | 18.4 | 72 | 100–120 |

The thermal stability of the diformates shows a declining tendency from potassium to ammonium diformate. Leakage of formic acid from the ammonium diformate proved to be substantially larger than for potassium diformate and this confirms the reported low decomposition temperature for the former component.

From Table I it can be seen that relatively high contents of formic acid can be obtained by using diformates as formate source in the feed additives. In addition to that, the formic acid will be bound stably in the disalt, especially the potassium- and sodium salts. This implies that leakage of acid and the resulting unstability thereof will be substantially reduced. This has been found to be of great importance both with regard to stability and handling properties during production of the final feed containing the formate additives.

Based on the above initial investigations, the following requirements for feed additives based on diformates were defined:

Formate content: >50%
Formic acid content: >20%
Water content: as low as possible, generally <1%
Desiccants: as low as possible, generally <1%

The final feedstuff generally contains 0.5–2% of formate based additives and the total content of sodium, potassium, calcium, ammonium and desiccant have to be kept within the specified values for feedstuffs, especially with regard to the sodium- and calcium content.

The additive product should preferably be dry and free-flowing for simplifying handling during packaging and handling in the feed production equipment.

The feed additive should not cause corrosion problems in the production equipment, accordingly the leakage of formic acid from dry additive and the final feedstuff should be very low.

The various additive mixtures were for practical reasons made in several steps. Thus one first made potassium diformate from which water had been removed by centrifugation down to about 5%, preferably residual water was removed in a drier unit, but a desiccant can be added to additives containing less than 5% water. Thus a dry, free-flowing product was obtained. Sodium- and ammonium diformate products were made in a similar way. Then these intermediate products were mixed in desired proportions to obtain feed additive products. The experiences from said lab scale production of the additives were the following:

Additives having a high content of potassium diformate were free-flowing, thermally stable and gave hardly any smell.

If the sodium diformate/tetraformate content was increased in the additive, then the product smelled more strongly.

If ammonium diformate was mixed into the additive, drying of the product was found to be difficult. Such products were more hygroscopic than potassium- and sodium diformate based products. Ammonium diformate increased the smell of formic acid from the product.

Concentrated solutions of diformates, for instance 55–70%, preferably potassium- and/or sodium diformate, could also be used as additive component to be mixed with the basic feed in amounts giving corresponding contents of formates in the feedstuffs as with the above described dry additives. When diformate solutions are used, special care must be taken to secure even distribution of the additive in the basic feed.

The additives according to the invention were mixed with conventional fodder in amounts of 0.2–2.5 weight %. Such animal feedstuffs according to the invention were found to be especially useful for piglets and pigs. Similar effects on poultry, calves and cows are expected, but not investigated thoroughly.

The animal feed additives according to the invention comprise disalts of formic acid in amounts of 20–99 weight % potassium diformate, 0–50 weight % sodium di-/tetraformate, 0–25 weight % calcium formate and 0–5 weight % water. The additive may also comprise a desiccant. The most preferred additives are characterised in that the additives comprises 20–60 weight % potassium diformate, 20–50 weight % sodium di/tetra-formate, 0–25 weight % calcium formate, 1–4 weight % desiccant and 0–5 weight % water.

Another preferred additive type comprises 60–99 weight % potassium diformate, 0–28 weight % calcium formate, 1–4 weight % desiccant and 0–5 weight % water.

The scope and special features of the invention are as defined by the attached claims.

The invention will be further explained in connection with the following examples.

EXAMPLE 1

This example shows the results of testing of several additive compositions with regard to stability, measured as loss of formic acid. 26 different compositions of additives comprising diformates were made. These additives contained different types and ratios of diformates and in addition calcium formate and desiccant could be added. The amount of water in the additives were also measured. The total weight of the additives made varied from 173–536 grams and from each additive composition samples of 25 grams were taken for stability tests. These tests were performed by placing the 25 gram samples 25° C. in a glass bell together with a beaker with 1 N NaOH lye. The glass bell was sealed and by removing the beaker after 2, 4 and 7 days respectively and analyse the lye with regard to acid the loss or leakage of acid from the additive could be measured. The relative stability of the various additive compositions could thus be determined. Two known commercial additives containing formic acid were also tested in the same way and the results were compared with those of the additives according to the invention.

These known additives comprises formic acid on porous carriers of silica. The compositions of the recipes which were tested with regard to loss of acid are shown in Table Ia. As can be seen from Table Ib not all the recipes were tested. The compositions and the loss of acid as a function of time are shown in Table Ib below.

TABLE Ia

Feed additive compositions

| Recipe No. | KH(COOH)$_2$ g | NaH(COOH)$_2$ g | Na$_2$H(COOH)$_4$ g | NaCOOH g | NH$_4$COOH g | NH$_4$H(COOH)$_2$ g | Ca(COOH)$_2$ g | H$_2$O g | Silicate g | Added silicate g | Tot. additive g |
|---|---|---|---|---|---|---|---|---|---|---|---|
| 1  | 100 |     | 50  |    | 50  | 50  |     | 22 | 33 |       | 256 |
| 2  | 100 |     | 50  |    |     |     | 50  | 17 | 0  | 20.25 | 237 |
| 3  | 100 |     | 50  |    |     |     | 50  | 8  | 8  |       | 216 |
| 4  | 100 |     | 100 |    |     |     | 100 | 22 | 0  | 23.93 | 346 |
| 5  | 150 |     |     | 50 |     |     | 50  | 8  | 12 |       | 270 |
| 6  | 100 |     | 50  | 50 |     |     |     | 17 | 0  | 17.4  | 234 |
| 7  | 50  |     | 100 |    | 50  |     |     | 27 | 41 |       | 268 |
| 8  | 50  |     | 100 |    |     |     | 50  | 20 | 31 |       | 251 |
| 9  | 100 |     | 100 |    | 200 |     |     | 55 | 82 |       | 536 |
| 10 | 100 |     |     |    |     | 100 | 100 | 35 | 0  | 42.8  | 378 |
| 11 | 100 |     |     |    | 100 |     |     | 27 | 41 |       | 268 |
| 12 | 100 |     |     |    |     |     | 100 | 14 | 20 |       | 234 |
| 13 | 90  |     |     |    | 60  |     |     | 20 | 31 |       | 201 |
| 14 | 80  |     |     |    |     |     | 70  | 11 | 0  | 11.91 | 173 |
| 15 | 100 |     |     |    | 200 |     |     | 41 | 61 |       | 402 |
| 16 | 100 |     |     |    |     |     | 200 | 14 | 20 |       | 334 |
| 17 | 100 | 100 |     |    |     |     |     | 27 | 0  | 18.95 | 246 |
| 18 | 100 | 100 |     |    | 100 |     |     | 41 | 61 |       | 402 |
| 19 | 100 | 100 |     |    |     |     | 100 | 27 | 4i |       | 368 |
| 20 | 100 | 100 |     |    |     | 100 |     | 27 | 0  | 66.85 | 394 |
| 21 | 400 |     |     |    |     |     | 50  | 12 | 12 |       | 475 |
| 22 | 400 |     |     |    |     |     |     | 21 | 32 |       | 453 |
| 23 | 100 | 100 |     |    |     |     | 200 | 27 | 0  | 45.4  | 473 |
| 24 | 200 |     |     | 50 |     |     | 50  | 27 | 0  | 20    | 347 |
| 25 | 100 |     | 100 |    |     | 100 |     | 27 | 41 |       | 368 |
| 26 | 100 |     | 100 |    |     |     |     | 11 | 16 |       | 226 |

TABLE Ib

Analyses - loss of acid

| Recipe No. | Test amount g | HCOOH- sample for testing g | 1 day HCOOH-loss mg | 2 days HCOOH-loss mg | 3 days HCOOH-loss mg | 4 days HCOOH-loss mg | 6 days HCOOH-loss mg | 7 days HCOOH-loss mg | Average HCOOH-loss % |
|---|---|---|---|---|---|---|---|---|---|
| 1  |      |      |       |      |       |      |       |      |      |
| 2  | 25.0 | 5.01 | 19.5  |      | 57.1  |      | 95.7  |      | 1.91 |
| 3  |      |      |       |      |       |      |       |      |      |
| 4  | 25.0 | 4.36 | 188.7 |      | 58    |      | 282   |      | 6.47 |
| 5  |      |      |       |      |       |      |       |      |      |
| 6  | 25.0 | 4.91 | 43.3  |      | 23    |      | 49.95 |      | 1.02 |
| 7  |      |      |       |      |       |      |       |      |      |
| 8  |      |      |       |      |       |      |       |      |      |
| 9  |      |      |       |      |       |      |       |      |      |
| 10 | 25.0 | 5.03 | 31.3  |      | 83.3  |      | 133.5 |      | 2.66 |
| 11 |      |      |       |      |       |      |       |      |      |
| 12 |      |      |       |      |       |      |       |      |      |
| 13 |      |      |       |      |       |      |       |      |      |
| 14 | 25.0 | 3.45 | 13.s  |      | 72.1  |      | 101   |      | 2.93 |
| 15 |      |      |       |      |       |      |       |      |      |
| 16 |      |      |       |      |       |      |       |      |      |
| 17 | 25.0 | 8.12 | 109.5 |      | 153.1 |      | 437   |      | 5.38 |

TABLE Ib-continued

Analyses - loss of acid

| Recipe No. | Test amount g | HCOOH-sample for testing g | 1 day HCOOH-loss mg | 2 days HCOOH-loss mg | 3 days HCOOH-loss mg | 4 days HCOOH-loss mg | 6 days HCOOH-loss mg | 7 days HCOOH-loss mg | Average HCOOH-loss % |
|---|---|---|---|---|---|---|---|---|---|
| 18 | | | | | | | | | |
| 19 | | | | | | | | | |
| 20 | 25.0 | 7.93 | 68.1 | | 173.2 | | 301.04 | | 3.80 |
| 21 | | | | | | | | | |
| 22 | | | | | | | | | |
| 23 | 25.0 | 4.38 | 93.9 | | 166.6 | | 267.9 | | 6.12 |
| 24 | 25.0 | 4.84 | | 17.50 | | 19.80 | | 39.50 | 0.82 |
| 25 | 25.0 | 6.32 | | 32.20 | | 35.44 | | 77.78 | 1.23 |
| 26 | 25.0 | 6.06 | | 22.10 | | 32.20 | | 84.20 | 1.39 |
| Formic Stabil | 25.0 | 10.50 | | 1772 | | 3598 | | 4472 | 42.59 |
| Formic Spray | 25.0 | 10.72 | | 330 | | 1430 | | 3202 | 29.88 |

The results of the above tests shows that formic acid bound to potassium diformate and/or sodium di/tetra-formate are far more stable than ammonium diformate. In this test the best additive composition showed a loss of formic acid in the range of 2% over a period of 7 days, compared to 3–6% over a 7 days period when the additive contained a high content of ammonium diformate. The commercial product, "Formic Spray" and "Formic Stabil" had losses of formic acid between 12–18% already after 4 days.

Based on the results from the above tests it was concluded that the most preferred additive compositions would be based on potassium and/or sodium diformates and a desiccant.

Two major types of additive compositions were then made for testing in feedstuffs.

| Type I | |
|---|---|
| Potassium diformate | 40–50% |
| Sodium di/tetra-formate | 20–25% |
| Calcium formate | 20–25% |
| Desiccant | 2–5% |
| Water | 3–6% |

The content of formic acid will be about 20% and the total content of formate about 65%.

| Type II | |
|---|---|
| Potassium diformate | 82–85% |
| Calcium formate | 9–12% |
| Water | 2–4% |
| Desiccant | 2–4% |

The content of formic acid will be about 30% and the total content of formate about 65%.

EXAMPLE 2

The two additives mentioned above were tested in a feeding experiment lasting 42 days. It was conducted with a total of 96 piglets (females and castrated males) in two consecutive runs. 2×6 litters with 8 weaned piglets each were bought from a piglet producing farm to reach a totally randomised complete block design. These 8 piglets of each litter, formed one experimental block, were randomly allotted to one of the 8 treatments described below, having equal numbers of females and castrates in each group:

| Group | Diet supplemented with | |
|---|---|---|
| 1 | no supplement | = negative control |
| 2 | 0.85% formic acid | = positive control |
| 3 | 0.65% Type I additive | |
| 4 | 1.30% Type I additive | |
| 5 | 1.95% Type I additive | |
| 6 | 0.65% Type II additive | |
| 7 | 1.30% Type II additive | |
| 8 | 1.95% Type II additive | |

During the first period of the experiment (day 1–21) a prestarter and during the second period (day 22–42) a piglet rearing feed were given ad lib. to the animals. Table II shows the composition of these feed mixtures which had to be constant for all treatments in terms of protein, amino acids, Ca, P and energy. As the new additives to be tested contained Na, Ca and K in considerable amounts and as they provide a small amount of energy too, it was necessary to add corn, soybean oil meal, fat and/or $CaCO_3$ to the very mixture depending on the supplemented amount of formic acid and Type I or II additives. In Table III the analysed crude nutrient concentrations and the calculated contents of minerals and metabolizable energy are given. Both feed mixtures met the requirements of growing piglets for nutrients, micro nutrients and energy and were administered in pelleted form.

TABLE II

Composition of the feed mixtures (%)

| | Prestarter | Piglet rearing feed |
|---|---|---|
| Corn | 28.2 | 28.5 |
| Barley | — | 5.0 |
| Wheat | — | 30.0 |
| Wheat bran | 14.0 | 10.0 |
| Rolled oats | 10.0 | — |

TABLE II-continued

Composition of the feed mixtures (%)

| | Prestarter | Piglet rearing feed |
|---|---|---|
| Soybean oil meat, extr. | 15.1 | 9.5 |
| Skimmed milk powder | 14.0 | — |
| Corn gluten feed | 5.0 | 5.0 |
| Fish meat | 5.0 | 5.7 |
| Fat mixture | 3.0 | — |
| Soybean oil | — | 1.1 |
| Vitam. mineral premix[1)] | 1.6 | 1.6 |
| L-Lysine HCl | 0.10 | 0.17 |
| DL-Methionine | 0.09 | — |
| Type 1 and 2 supplement and adjustment to energy, protein and Ca content | 3.91 | 3.43 |

[1)]per kg feed: 3.2 g Ca, 1.3 g P, 0.9 g Na, 0.2 g Mg, 77 mg Fe, 17 mg Cu, 22 mg Mn, 64 mg Zn, 0.8 mg J, 0.2 mg Se, 9600 I.U. Vit. A, 960 I.U. Vit. $D_3$, 32 mg Vit. E, 0.7 mg Vit. $B_1$, 1.4 mg Vit. $B_2$, 1.1 mg Vit. $B_8$, 10 μg Vit. $B_{12}$, 9 mg nicotinic acid, 5.6 pantothenic acid, 0.4 mg Vit. $K_3$, 190 mg cholin chloride, 0.3 mg folic acid, 48 μg biotin.

TABLE III

Concentrations of nutrients and energy in the feed mixtures used (% of FM)

| | Prestarter | Piglet rearing feed |
|---|---|---|
| Dry matter | 89.7 | 87.9 |
| Crude ash | 6.9 | 5.4 |
| Crude protein | 22.1 | 18.0 |
| Crude fat | 4.9 | 5.0 |
| Crude fibre | 5.5 | 4.4 |
| N-free extracts | 50.3 | 55.1 |
| Lysine*[)] | 13.5 | 10.0 |
| Methionine*[)] | 5.1 | 3.4 |
| Calcium*[)] | 10.5 | 9.0 |
| Phosphorus*[)] | 8.6 | 7.5 |
| Sodium*[)] | 1.4 | 2.0 |
| Energy (MJ MR/kg)*[)] | 13.2 | 13.0 |

*[)]Calculated

EXAMPLE 3

The influence of the additions used on the pH and the acid binding capacity of the individual feed mixtures (10% feed suspensions) is shown in Table IV.

TABLE IV pH value and acid binding capacity of the feed mixtures used

| Group | 1 | 2 | 3 | 4 | 5 | 6 | 7 | 8 |
|---|---|---|---|---|---|---|---|---|
| Supplement | — | 0.83% formic acid | 0.65% | 1.30% Type 1 | 1.95% | 0.65% | 1.30% Type 2 | 1.96% |
| Prestarter | | | | | | | | |
| pH value | 5.10 | 4.10 | 5.18 | 4.57 | 4.41 | 4.76 | 4.69 | 4.50 |
| acid binding capacity (meq HCl/kg for pH 3.0) | 672 | 660 | 716 | 748 | 760 | 706 | 756 | 805 |
| Piglet rearing feed | | | | | | | | |
| pH value | 5.16 | 4.28 | 5.00 | 4.71 | 4.63 | 6.38 | 5.12 | 4.94 |
| acid binding cap. (meq HCl/kg for pH 3.0) | 544 | 529 | 595 | 605 | 672 | 608 | 639 | 664 |

In both diets the initial pH value of 5.1–5.2 in the unsupplemented control feed, which already was rather low, dropped by adding Type I or II additives to a minimum of pH 4.4 depending of the dosage, but did never reach that value caused by adding pure formic acid. In the prestarter there was no difference between the effects of Type I and Type II additives, but in the rearing feed Type I additives caused 0.4 units lower pH values compared with Type II additives. The acid binding capacity, which means the amount of HCl addition necessary to reach a pH value of 3.0 in the feed, reacted contrarily to the pH values. The higher the supplementation and the lower the pH value, the higher was the acid binding capacity, indicating a greater buffer capacity of the added substances.

With Type II additives this effect was the greater. The distinctly stronger acid binding capacity of the prestarter diet compared with the rearing feed mixture was due to its higher protein and mineral contents.

The weight development, feed intake and feed conversion of the piglets during the whole experiment are shown in the following Table V:

TABLE V

Live weights, daily gains, daily feed intake and feed conversion rate during the whole experiment (day 1–42)

| Group | 1 | 2 | 3 | 4 | 5 | 6 | 7 | 8 |
|---|---|---|---|---|---|---|---|---|
| Supplement | — | 0.86% formic acid | 0.65% | 1.30% Type 1 | 1.95% | 0.65% | 1.30% Type 2 | 1.95% |
| Initial weight, (kg) | 6.66 ±0.70 | 6.73 ±0.56 | 6.66 ±0.81 | 6.65 ±0.82 | 6.65 ±0.69 | 6.67 ±0.72 | 6.66 ±0.90 | 6.65 ±0.89 |
| relative | 100 | 101 | 100 | 100 | 100 | 100 | 100 | 100 |
| Final weight, (kg) | 26.66 ±3.23 | 28.67 ±4.81 | 27.80 ±2.54 | 29.54 ±4.08 | 29.85 ±3.29 | 29.50 ±3.87 | 28.04 ±3.11 | 29.07 ±3.63 |
| relative | 100 | 108 | 104 | 111 | 112 | 111 | 105 | 112 |
| Daily gains (g) | 476 ±71 | 523 ±105 | 503 ±52 | 545 ±82 | 553 ±73 | 544 ±79 | 509 ±61 | 656 ±73 |
| relative | 100 | 110 | 106 | 115 | 116 | 114 | 107 | 117 |
| Daily feed intake (g) | 768 ±113 | 817 ±159 | 7.888 ±96 | 816 ±126 | 848 ±117 | 860 ±121 | 780 ±88 | 845 ±102 |
| relative | 100 | 106 | 103 | 110 | 110 | 112 | 102 | 110 |
| Feed conversion (kg feed/kg gain) | 1.62$^a$ ±0.07 | 1.57$^{bc}$ ±0.07 | 1.58$^{bc}$ ±0.05 | 1.55$^{bc}$ ±0.04 | 1.53$^{bc}$ ±0.05 | 1.59$^{ab}$ ±0.07 | 1.53$^{bc}$ ±0.06 | 1.52$^a$ ±0.05 |
| relative | 100 | 97 | 96 | 96 | 94 | 98 | 94 | 94 |

$^{a,b,c}$significantly different means (P < 0.05; SNK-test)
*significantly different from group 1 (= negative control) by Dunnett-test (P < 0.05)

With a mean live weight of 6.7 kg, the same for each group, the piglets with the new additives gained 22.5 kg during the whole experiment of 42 days. Meanwhile the animals of the negative control group gained just 20.0 kg, those with pure formic acid addition 22.0 kg. Group 8 however, (1.95% Type II additive) had a significantly higher weight than group 1. 16–17% higher daily weight gains during the whole experiment were only observed with the highest dosages of the new additives. The feed conversion rate was markedly better with feed additives, especially with 1.95% of Type I (group 5) or 1.30%, respectively 1.95% of Type II additives (group 7 and 8). Both Type I and II seemed to be more effective than pure formic acid.

EXAMPLE 4

For the two separate experimental periods (see Table VI) it was proved that the new additives were more efficient within the prestarter feeding (day 1–21), according to growth between 6.5–16 kg, than within the consecutive rearing feeding (day 22–42). With average daily gains during this first period being 20% higher with Type II and 13% higher with Type I additives compared to group 1 without additives. Especially Type II gave an even greater advantage than pure formic acid addition.

TABLE VI

Live weights, daily gains, daily feed intake and feed conversion rate during both experimental periods (day 1–21)

| Group | 1 | 2 | 3 | 4 | 5 | 6 | 7 | 8 |
|---|---|---|---|---|---|---|---|---|
| Supplement | — | 0.85% formic acid | 0.65% | 1.30% Type 1 | 1.95% | 0.65% | 1.30% Type 2 | 1.95% |
| 1st. period (day 1–21) | | | | | | | | |
| Daily gains (g) | 372$^b$ ±71 | 432$^{ab}$ ±89 | 396$^{ab}$ ±54 | 435$^{ab}$ ±77 | 434$^{ab}$ ±86 | 458$^{ab}$ ±80 | 410$^{ab}$ ±78 | 461$^a$ ±68 |
| relative | 100 | 116 | 106 | 117 | 117 | 123 | 110 | 124 |
| Daily feed intake (g) | 487 ±77 | 516 ±92 | 498 ±64 | 521 ±85 | 520 ±83 | 550 ±90 | 484 ±81 | 646 ±71 |
| relative | 100 | 106 | 102 | 107 | 107 | 113 | 99 | 112 |
| Feed conversion (kg feed/kg grain) | 1.32$^a$ ±0.10 | 1.20$^b$ ±0.06 | 1.26$^b$ ±0.06 | 1.20$^b$ ±0.05 | 1.21$^b$ ±0.07 | 1.21$^b$ ±0.08 | 1.19$^b$ ±0.07 | 1.19$^b$ ±0.05 |
| relative | 100 | 91 | 95 | 91 | 92 | 92 | 90 | 90 |
| 2nd. period (day 22–42) | | | | | | | | |
| Daily gains (g) | 580 ±110 | 613 ±124 | 611 ±78 | 654 ±100 | 871 ±76 | 629 ±83 | 608 ±65 | 649 ±98 |
| relative | 100 | 106 | 105 | 113 | 116 | 108 | 105 | 112 |
| Daily feed intake (g) | 1.049 ±171 | 1.117 ±143 | 1.078 ±230 | 1.172 ±187 | 1.176 ±163 | 1.171 ±158 | 1.078 ±111 | 1.144 ±147 |
| relative | 100 | 106 | 103 | 112 | 112 | 112 | 103 | 109 |
| Feed conversion | 1.82$^{ab}$ | 1.83$^{ab}$ | 1.77$^{ab}$ | 1.79$^{ab}$ | 1.75$^b$ | 1.86$^a$ | 1.77$^{ab}$ | 1.77$^{ab}$ |

TABLE VI-continued

Live weights, daily gains, daily feed intake and feed conversion
rate during both experimental periods (day 1–21)

| Group | 1 | 2 | 3 | 4 | 5 | 6 | 7 | 8 |
|---|---|---|---|---|---|---|---|---|
| (kg feed/kg grain) | ±0.12 | ±0.11 | ±010 | ±0.07 | ±0.12 | ±0.09 | ±0.11 | ±0.09 |
| relative | 100 | 101 | 97 | 98 | 96 | 102 | 97 | 97 | a,b significantly different means (P < 0.05; SNK-test)
*significantly different from group 1 (= negative control) by Dunnett-test (P < 0.05)

Additionally to the performance data, the percental frequency of diarrhoea (days of diarrhoea×100/number of animals/days of experiment) were calculated for the piglets with the following results:

| Group | Supplement | Diarrhoea frequency |
|---|---|---|
| 1 | none | 8.2% |
| 2 | 0.85% formic acid | 6.7% |
| 3 | 0.65% Type I additive | 8.7% |
| 4 | 1.30% Type I additive | 6.6% |
| 5 | 1.95% Type I addI.tive | 6.3% |
| 6 | 0.65% Type II additive | 8.4% |
| 7 | 1.30% Type II additive | 5.8% |
| 8 | 1.95% Type II additive | 5.4% |

As can be seen from this experiment the diarrhoea frequency was in fact very low. Mainly minor cases of diarrhoea were observed, which often happen when piglets are fed ad lib. There seemed to be some tendency to lower diarrhoea frequency with higher dosages of the new additives, especially with Type II additives.

EXAMPLE 5

This example shows the results of tests performed on slaughter pigs. The tests comprised application of four different feedstuffs, the first one called "Standard feed" had the following composition:

| "Standard feed" | weight % |
|---|---|
| Barley | 78.78 |
| Soya meal | 10.00 |
| Rape meal, Canola | 8.00 |
| Lime stone meal | 1.50 |
| Monocalcium phosphate | 1.00 |
| Salt (Sodium chloride) | 0.50 |
| Micro minerals | 0.04 |
| Vitamines | 0.03 |
| L-Lycine | 0.15 |

The following feedstuffs were used:

Group 1. Standard Feed
Group 2. Standard Feed + Ca/Na-formates 50/50 corresponding to 1% formic acid.
Group 3. Standard Feed + 1% pure formic acid.
Group 4. Standard Feed + Type II additive, corresponding to 1% formic acid.

TABLE VII

| Test group: | 1 | 2 | 3 | 4 |
|---|---|---|---|---|
| Number of animals | 12 | 12 | 12 | 12 |
| Animals slaughtered | 11 | 11 | 12 | 12 |
| Starting weight kg | 23.19 | 22.54 | 23.00 | 23.17 |
| Slaughter weight kg | 98.00 | 99.18 | 99.00 | 99.33 |
| Area of meat in cutlet, $cm^2$ | 39.85 | 39.51 | 42.50 | 43.00 |
| Area of fat in cutlet, $cm^2$ | 29.98 | 19.63 | 19.21 | 17.29 |
| Meat in percent of cutlet | 51.90 | 66.86 | 68.87 | 71.32 |
| Feed units fattening/ kg corrected weight gain | 2.35 | 2.26 | 2.22 | 2.19 |

From these tests it can be seen that the new additive and feedstuff according to the invention improves the feed conversion and the relation between meat and lard for the slaughter pigs, even relative to formic acid.

From the above experiments it can be seen that the new additives are suitable for promoting growth and mainly to improve feed conversion rate, especially during the pre-starter period. There were no significant differences between the two additives, but with Type I sometimes higher dosages seemed to be necessary to reach the same efficiency as with Type II additives. The influence on the diarrhoea frequency proved to be slightly positive with application of the new additives.

We claim:
1. A free-flowing animal feed additive comprising diformates, characterized in that the additive comprises 20–99 weight % potassium diformate, 0–50 weight % sodium di/tetra-formate, 0–25 weight % calcium formate, and 0–5 weight % water.
2. Animal feed additive according to claim 1, characterized in that the further comprises 0–4 weight % desiccant.
3. Animal feed additive according to claim 1, characterized in that the additive comprises 20–60 weight % potassium diformate, 20–50 weight % sodium di/tetra-formate, 0–25 weight % calcium formate, 1–4 weight % desiccant and 0–5 weight % water.
4. Animal feed additive according to claim 1, characterized in that the additive comprises 60–99 weight % potassium diformate, 0–25 weight % calcium formate, 1–4 weight % desiccant and 0–4 weight % water.
5. Animal feedstuff comprising disalts of formic acid, characterized in that the feedstuff comprises 0.2–2.5 weight % of additives according to any one of claims 1–4.

* * * * *